United States Patent
Garland et al.

(10) Patent No.: US 6,633,637 B1
(45) Date of Patent: Oct. 14, 2003

(54) SUPPRESSED RINGING CONNECTIVITY

(75) Inventors: Stuart Mandel Garland, Morton Grove, IL (US); Joseph James Lichter, Naperville, IL (US); Carl William Smedberg, Jr., Sugar Grove, IL (US); David B. Smith, Hinsdale, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/346,469

(22) Filed: Jul. 1, 1999

(51) Int. Cl.[7] .......................... H04M 7/00; H04M 11/00

(52) U.S. Cl. .............. 379/230; 379/106.03; 379/106.09

(58) Field of Search ....................... 379/106.09, 106.01, 379/106.03, 229, 230, 243, 90.01, 207.02, 207.04

(56) References Cited

U.S. PATENT DOCUMENTS

| | | | | |
|---|---|---|---|---|
| 5,189,694 A | * | 2/1993 | Garland ................. | 379/106.09 |
| 5,394,461 A | * | 2/1995 | Garland ................. | 379/106.09 |
| 5,452,343 A | * | 9/1995 | Garland et al. ........ | 379/106.09 |
| 5,579,381 A | * | 11/1996 | Courville et al. ...... | 379/106.09 |

* cited by examiner

Primary Examiner—Benny Tieu

(57) ABSTRACT

A method and apparatus for establishing a suppressed ringing connection between a server and customer premises equipment, wherein the server is connected to a first switch and the customer premises equipment is connected to a second switch, different from said first switch. The switch connected to the server has translation information identifying the trunk to the server as a server trunk. Signaling between the server, which is not connected to the Common Channel Signaling Network (CCS7), and the second switch is performed according to the protocols used for sending messages to a switch connected to the target customer premises equipment that is at the other end of the suppressed ringing connection. The first switch converts signals received from the server into a common channel signaling format for transmission to the second switch, serving the target CPE. The second switch then establishes a suppressed ringing connection to the target CPE. Alternatively, a dial-up connection can be used to connect the server to the first switch. Advantageously, these arrangements free the server from having to provide trunks to all switches connected to target CPEs. They make it possible, for example, for one server to serve CPEs throughout the county via one, or a small number of switches.

35 Claims, 10 Drawing Sheets

SUPPRESSED RINGING CONNECTIVITY

TECHNICAL FIELD

This invention relates to arrangements for accessing customer premises equipment using suppressed ringing connection, and more specifically, relates to arrangements for more efficient trunk access from a server to the switches serving the customer premises equipment.

Problem

The use of an Intelligent Pathway™ to access customer premises equipment is well known in the prior art. The connection for accessing the equipment is made by suppressing the ringing or other normal alerting signal to the customer so that the customer is not induced to try to answer the call, and that normal terminating features for the customer, such as call forwarding and call waiting are bypassed for this connection. The suppressed ringing connection, also known as an Intelligent Pathway, uses frequency shift keying (FSK), or tone signals to perform an alerting function for the analog or digital customer premises equipment with which it may communicate in either the off-hook or on-hook mode. The communications can be initiated by a server, or can be initiated by the customer premises equipment. In either case, the communication takes place without disturbing the customer or being affected by customer features, over the same loop that is used for customer telephone conversations.

A problem of the prior art is that servers communicate with the switches that are connected to the customers having such customer premises equipment (CPE) over special trunks so that the switches can know from the class of service of the special trunk that connections are to be set up on a suppressed ringing basis. Disadvantageously, this arrangement requires the use of trunks between the server and the each switch serving such CPE.

More broadly, the problem is that a server trunk, i.e., a trunk connecting a server system such as a Utility to a switch, can only be used to access lines connected to that switch, and can only be used for an Intelligent Pathway connection. Further, a suppressed ringing call cannot be forwarded from one switch to another using common inter-office trunks.

Solution

The above problem is solved, and an advance is made over the prior art by requiring that the only dedicated trunks be a group of trunks from the server to a convenient switch, and that the character of the requested connection, i.e., the Intelligent Pathway connection, (also known as a suppressed ringing connection), be indicated by a common channel signaling, (CCS7) message identifying a connection from the first switch to any other switch; the connection being made over any available voice trunk to be established as an Intelligent Pathway (suppressed ringing), connection by the terminating switch. The CCS7 message can also convey other suppressed ringing parameters such as an abbreviated ring selection and/or the CPE type. Advantageously, the only dedicated trunks are those between the server and one or more convenient switches. Advantageously, the Public Switched Telephone Network can be used to provide trunks from the initial switch to the switch that serves the CPE. Advantageously, this also removes distance limitations between the server and the CPE, thus permitting one server to serve customers throughout a region, or country; especially, for those cases in which the occupancy of each of the Intelligent Pathway connections is relatively low.

Accordingly, the information received from a server trunk can be combined with the information, (translation information), characterizing the class of service of that trunk, and both can be transmitted over the CCS7 network using an enhanced CCS7 protocol, to a terminating switch serving a line to be accessed from the server trunk. The server trunk is then connected over the Public Switched Telephone Network to that terminating switch, and the server trunk can then access the CPE served by the terminating switch. Advantageously, this arrangement allows a serving trunk to access any type of CPE connected to the Public Switched Telephone Network, provided that the switches use a common signaling protocol, provided that signaling protocol is enhanced to carry the call information, class of service information of the serving trunk and other parameters, and provided that the terminating switch is adapted by program means to accept and process the enhanced signaling protocol.

This arrangement also solves the problem of number portability wherein a customer may move and be served by another switch without changing the directory number of the customer. The CCS7 message can be forwarded to the new switch from the switch receiving the CCS7 message and the trunk connection from the server.

Another method of implementing the link between the Application Controller (Server) and the local serving switch, is to provide a predetermined "special" dial-in number that activates the suppressed ringing software on the serving switch to provide a suppressed ringing connection for the duration of the call(s). One or more suppressed ringing calls could be placed during one dial-in session. An alternative would require the serving switch to terminate the original call at the special number, and hang up. The switch would place a call back to the Application Controller, thus providing for security while establishing a dedicated Suppressed Ringing call processing activation in the switch. If the security call back were not active, the switch would provide (suppressed ringing) security by looking at the Automatic Number Identification, (ANI) of the incoming call.

This method of communicating with the switch eliminates the requirement that the links from the Controller to its local serving office be dedicated. Therefore, using this method of dialing a "special" number to activate the feature, permits the links to be dedicated for the duration of the call only.

Another advantage of this method of evoking the Suppressed Ringing feature may be seen if there are no CCS7 trunks to a far office. Using this method, a Controller may dial the "Special Suppressed Ringing" feature number on the far switch, and communicate directly to the far switch. The far switch is requested by virtue of receiving a call to the "Special Number", to provide the Suppressed Ringing call processing. Either security method could be implemented.

Alternatively, if CCS7 links are not available, the near switch may place a call to the far switch using the "Special Number" for Suppressed Ringing, and complete the call without the Controller knowing that the call has been routed in this manner. To accomplish this, the near switch would do a database look-up once it determines that CCS7 trunks are not available. A call is placed to the far end "Special Number" and bridged with the original telemetry call.

DETAILED DESCRIPTION

1.0 Overall Description

Figure 1:
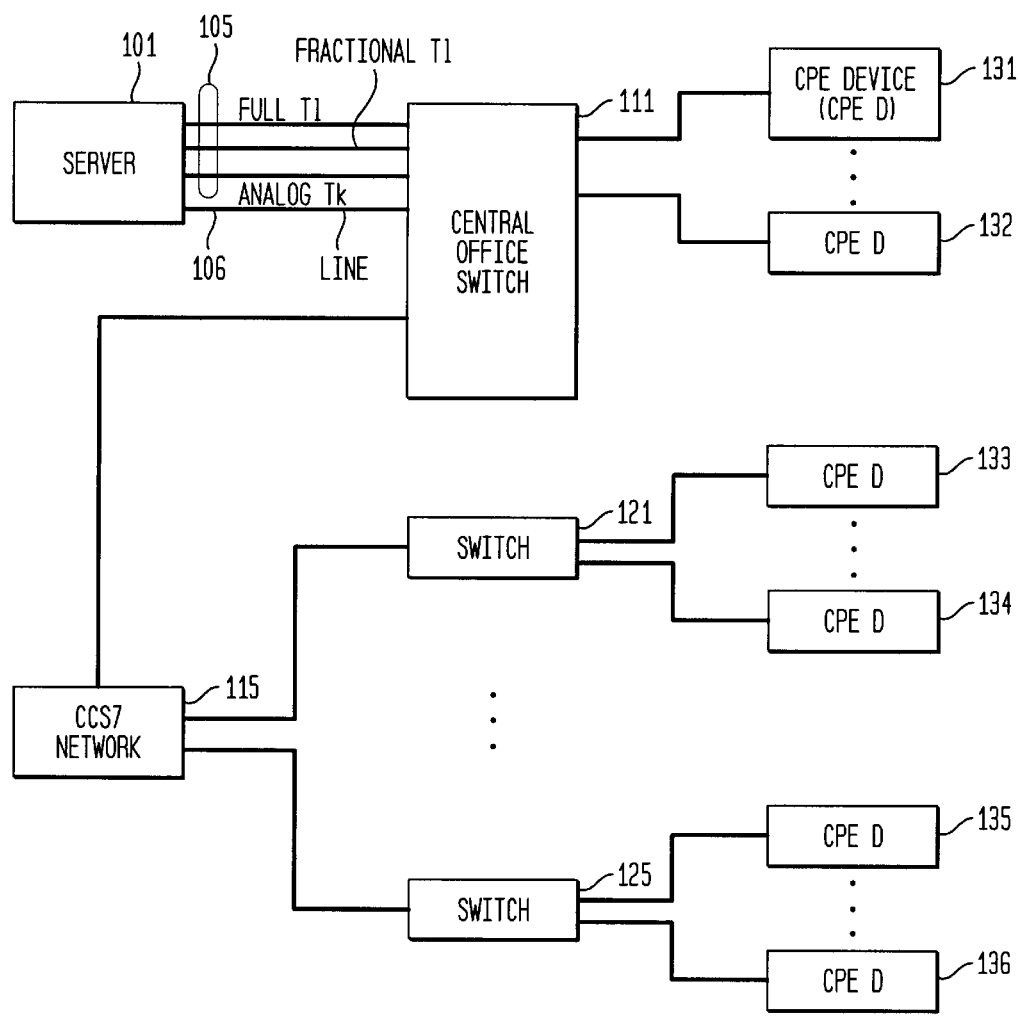
FIG. 1 is a block diagram illustrating the system connections of the invention.

FIG. 1 is a block diagram showing the basic operation of Applicants' invention. A Server 101 wishes to access or be accessible from, a plurality of CPE devices. The server is close to a Switch 111 which is connected to CPE Devices 131, . . . 132. In addition, the server is located at a greater distance from other Switches 121, . . . 125, serving CPE Devices 133, . . . 134, . . . , and Switch 125 serving CPE Devices 135, . . . , 136. The Switches 111, 121, and 125 are interconnected by the Public Switched Telephone Network, using CCS7 signaling messages as the means for communicating signaling messages among the switches. Server 101 is connected to Switch 111 by a Trunk Group 105, comprising one or more trunks. The trunk group can be a single channel of digital carrier such as T-1, or a full T-1 channel group, or a single analog trunk, or it can be a group of such digital carrier channels, or analog trunks to the trunk plant interconnecting the server, and the central office is the trunk plant of the prior art.

In an alternative embodiment, the server dials over a line 1.06 for a suppressed ringing connection. This connection can be used directly, or can request a call back from switch 111. This arrangement avoids the use of a dedicated trunk such as a trunk of trunk group 105, and is especially sound economically if the usage of the connection from the server is relatively low.

Further details of this type of arrangement for accessing the switch in order to place a suppressed ringing connection, are found in Section 3.6.

Switch 111, in accordance with the principles of the prior art, recognizes that incoming calls over the Trunk Group 105 are requests for Intelligent Pathway, (suppressed ringing), connections. If the CPE device identified by the connection request received from the server is a CPE device connected to a loop served by Switch 111, then the connection is established in accordance with the principles of the prior art. However, if Switch 111 recognizes that the CPE to which a connection is requested is served by another switch such as Switch 121, . . . 125, then Switch 111, acting as a tandem switch requests a connection to the appropriate terminating Switch 121, . . . ,125. Note that this feature can be used in case, using local number portability, tile customer, formerly served by this switch, is now served by another switch even though the customer's directory number has not been changed.

The signaling messages for requesting this connection of the Public Switched Telephone Network are enhanced to include the data necessary for identifying that the requested connection is an Intelligent Pathway connection, and provides the additional data necessary to inform the terminating switch serving the CPE to which a connection is requested, of any additional information shown, required to establish the connection. For example, for a CPE that is connected to a switch via a subscriber loop carrier, (SLC) system, then in accordance with the prior art, it is necessary to inform the switch serving that CPE of the length of a preliminary burst of ringing required in order to establish the connection through the SLC serving that CPE. (This is in accordance with the teachings of the prior art).

The connection from the server to Switch 111 is a trunk connection, because the server is not connected to the CCS7 Network. (Establishing such a connection would be a very complex design task). The server is limited to the kinds of signaling that is possible from a non-CCS7 trunk. Typically, such signaling includes two such sets of strings; KP+CTI+ ANI+ST; and KP+7/10 DN+ST (ST, ST', ST", ST'"); where KP is the key pulse signal that is the beginning of a multi-frequency (MF) protocol string, CTI is a series of digits defining the type of CPE device, (e.g., off-hook or on-hook data transmission capability), with which the server is communicating, ANI is the billing number of the service provider, ST is the start signal which ends the basic string, and DN is the directory number of the device to be connected to it. The ST signal of the second string may be one of 4 possible ST signals, (ST, ST', ST", and ST'"), wherein three of the four ST signals requests a suppressed ringing connection, representing 3 possible lengths of an initial burst of ringing tone. (The length of the three bursts may be zero or more, and are defined in translation information for the trunk). In accordance with a new Bellcore standard, the ST'" signal is reserved for a fixed open, (no voltage), signal on the loop, for interfacing with subscriber loop carrier systems designed to provide this type of signal. If more than three different lengths are required in one switch, (very rare), then separate trunk groups are used for the additional lengths of the initial bursts. Other types of messages can readily be added.

To begin the call set-up, the application service provider goes off-hook, seizes the Intelligent Pathway trunk, and after a wink, (Start), out-pulses the CTI digits, Automatic Number Identification directory number (ANI), the called directory number (DN), and if necessary, the ring duration for loop current feed open signal required for the destination to make the connection to the CPE. With the existing direct trunking, Intelligent Pathway calls are considered intra-switch, and are not allowed to leave the local switch. With the CCS7 inter-office trunking capability, the originating switch, upon receipt of the Intelligent Pathway trunk signals, will set the call routing by internal translations, or by a database "look-up". These suppressed ringing signals must be forwarded from the originating switch to the terminating switch by the CCS7 protocol elements, through the initial address message, (IAM), and an optional continuity test (COT), for satisfying standard protocols. The terminating switch accepts these elements as an Intelligent Pathway trunk input to call processing. Thus, the CCS7 must carry this information in the CCS7 messages, and the CCS7 protocol must be adapted to carry such information. The information concerning CPE parameters is normally provided by the Server, but may be provided by the switch if the switch initiates communications.

This Application relates to a provision of Intelligent Pathways. However, the basic principle underlying the Application is that of allowing a trunk which is normally connected from some form of server to a switch, and connected by the switch to a line, to be able to access lines connected to other switches. The mechanism for making such a connection is the CCS7 Network, and the adaptation of the network is to allow all data required to identify the characteristics of the trunk, and all data for the call to be transmitted by the CCS7 signaling network to a terminating switch for serving the line that is to be accessed. In order to accomplish this goal with any particular kind of server trunk, the CCS7 protocol must be adapted to transport all the required information, and the terminating switch must be adapted to extract this information from, for example, an initial address message, and thereby treat its incoming trunk as if that incoming trunk were the server trunk.

In this example, the server is connected to an originating switch which may be connected to a tandem switch which may be connected in turn to a terminating switch. The CCS7 messages are relayed from the originating switch to the tandem switch, (if any), to the terminating switch. Call set-up, call tear-down, and call progress messages are relayed switch to switch. For set-up and disconnect operations, the relaying is necessary in order to inform the tandem switch of the necessity of changing connections in that switch.

2.0 Detailed Description of Intelligent Pathway Platform

The Intelligent Pathway platform allows an application service provider, utilizing the standard switch fabric, to place a no-ring call to a residence or business. The no-ring call is a cut through connection and is not affected by features assigned to the line such as Call Forwarding or Call Blocking. The Intelligent Pathway platform is presently used for data communications but since it uses the full 4K analog local loop, it can also be used for voice services.

During the initial development of the Intelligent Pathway platform, it was decided that analog E & M interoffice trunks would directly connect the application server to each switch. The decision was based on the fact that the Intelligent Pathway service was to be available throughout the entire network. (In 1990, CCS7 was not universally deployed). The Intelligent Pathway call was of a short duration. Call set-up was a substantial portion of the approximately two second data transfer of the call. Using interswitch analog E & M trunks would increase the call setup time for each hop of the interswitch trunk. Therefore, directly connected analog E & M interoffice trunks were used for universality and to minimize call setup time.

During the initial trials of the Intelligent Pathway Service, the local telephone providers, (telcos) indicated that there is a "high" cost of deploying directly connected analog E & M trunks between the application service provider and the COs. Given the low start-up call volume, the cost of these trunks appeared to be "high".

As the years passed, T carrier digital trunks replaced the analog E & M trunks thereby reducing the cost of the Intelligent Pathway overlay network. However, this reduction in cost did not sufficiently reduce the networking costs because direct trunking was still required to remote switches.

Now CCS7 interswitch trunking is available throughout most all of the network. The following described CCS7 interswitch trunking/signaling platform capability for Intelligent Pathway will allow for a lower cost network deployment without compromising the set up time advantages of an overlay network.

The CCS7 network will allow for call setup messages to be delivered to the terminating switch with parameters indicating that this call is a special Intelligent Pathway call. The existing fields, and possibly new fields in ISUP messaging, would contain a mapping of the E & M trunking signals to the CCS7 messages. The E & M signals are emulated on T carrier trunks. Changes in the suppressed ringing software to allow the Intelligent Pathway call to be output to an outgoing CCS7 trunk are relatively straightforward. The Intelligent Pathway Trunk incoming connection to the switch is already defined as being digital or analog.

2.1 Intelligent Pathway Service (FIG. 1)

There are three capabilities to the Intelligent Pathway Platform. The first capability is outbound data communications. Outbound is viewed as a call initiated from the application service provider and terminating at the end user. The second capability is inbound data communications. Inbound is viewed as a call initiated from the end user to the application service provider. The third capability is an enhancement to the Intelligent Pathway trunk protocol. This enhancement provides additional services for the service provider.

FIG. 1 illustrates the Intelligent Pathway architecture. The application service provider connects to the switch through an Intelligent Pathway Trunk (analog or digital E & M type). There may be multiple trunks, configured as trunk groups, connected between the application service provider and multiple switches. The specific number of trunks and trunk groups is engineered for the expected traffic between the service provider and the switch. The application service provider places a call to the CPE on the end user's premises without ringing the line and without being affected by the features on the line. Remote Switching Modules & Systems and Pair Gain equipment sometimes support these loops.

The Intelligent Pathway service is applicable to analog or digital end users. The service is independent of the local loop medium, and can serve lines connected by copper wire, coaxial cable, or optic fiber.

2.2 Intelligent Pathway Trunk Protocol

The basic Intelligent Pathway trunk protocol between the application service provider and the switch is defined as follows:

---

KP + CTI + ANI + ST
KP+ 7/10DN + ST (ST, ST', ST", ST''')
where:
    KP is the beginning of the protocol string
    CTI defines a CPE device with off-hook or on-hook data transmission capability
    ANI is the billing number of the service provider
    ST in the 1st string defines basic protocol
    7/10 DN is the connect to 7/10 digit directory number
    ST, ST', ST", ST''', in the 2nd string defines the abbreviated
    ringing duration or loop open condition.

3.0 CCS7 Interoffice Signaling

The Intelligent Pathway platform has previously only used directly connected analog or digital E & M interoffice trunking between the application service provider and the switches. This CCS7 platform capability adds the ability to utilize the CCS7 network for distributing interswitch calls eliminating the need for costly directly connected trunks to each switch. All terminating switches require the suppressed ringing software. It is anticipated that normal CCS7 call processing would be followed.

3.1 Suppressed Ringing Call Processing

The existing suppressed ringing software is modified to allow egress onto the CCS7 network. An incoming CCS7 trunk is added to the allowable Intelligent Pathway Trunk (UTT) classes. Since the traffic entains tones and modem traffic, the bearer capability should be speech or 3.1 KHz audio.

Figure 2:
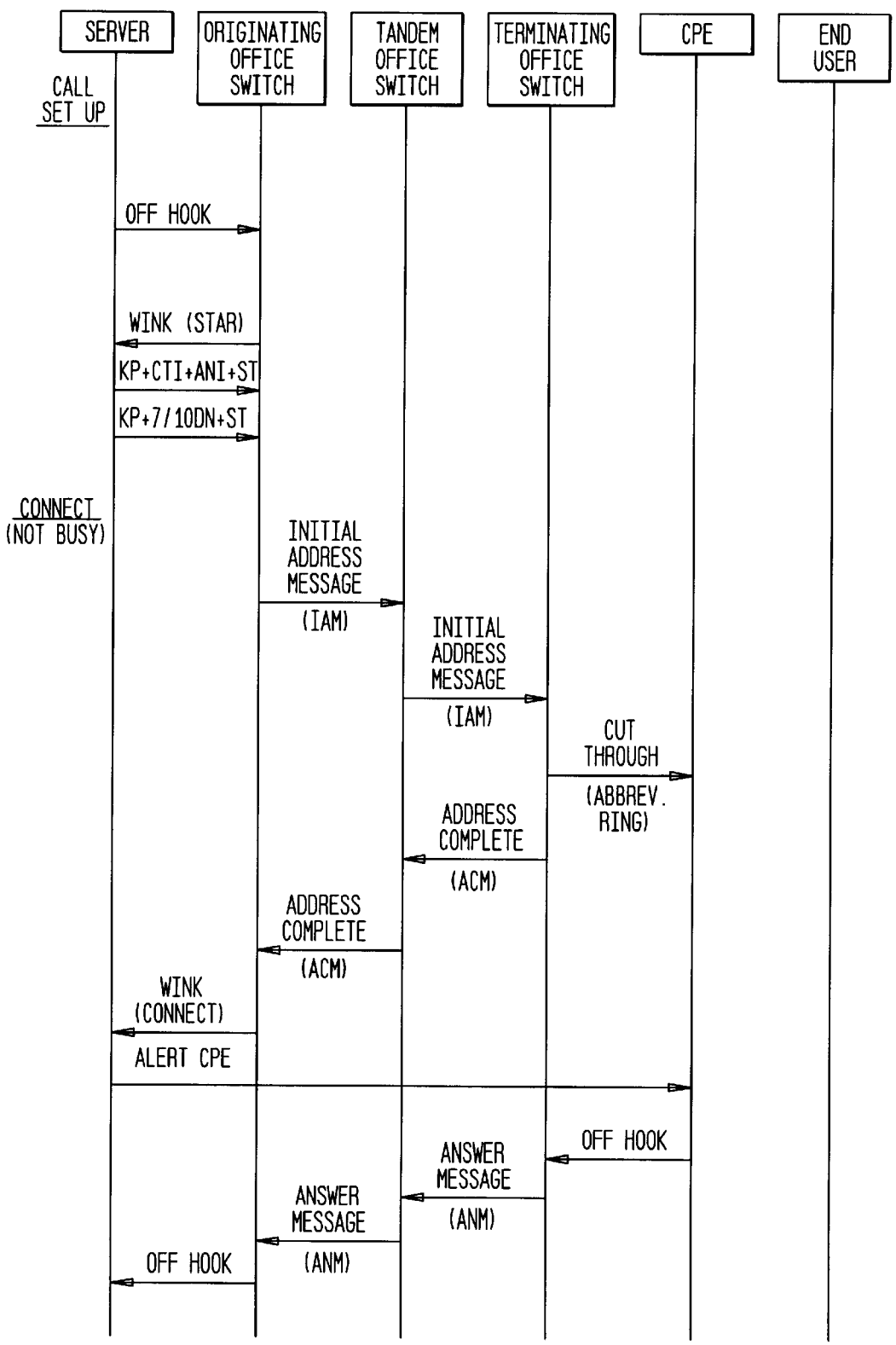
FIGS. 2 and 3 illustrate the steps in setting up an intelligent pathway trunk connection.

3.2 CCS7 Call Flow Example
3.2.1 Intelligent Pathway Trtink Call Set Up (FIG. 2)

To begin the call set-up, the application service provider goes off-hook, seizes the Intelligent Pathway Trunk and, after a Wink (Start), outpulses the CTI digits, ANI, Directory Number, and Ring Duration or Loop Current Feed Open required for the destination to make the connection to the CPE. With the existing E & M intraoffice trunking, Intelligent Pathway calls are considered intraswitch only and are not allowed to leave the local switch. With the CCS7 interoffice trunking capability, upon receipt of the Intelligent Pathway trunk signals, the originating switch will set the call routing by internal translations or by a database lookup. These signals must be forwarded from the originating switch to the terminating switch by the CCS7 protocol elements through the Initial Address Message (IAM), and optional (Standard) Continuity Test (COT). The terminating switch would then accept these elements as a Intelligent Pathway trunk input into call processing.

Figure 3:
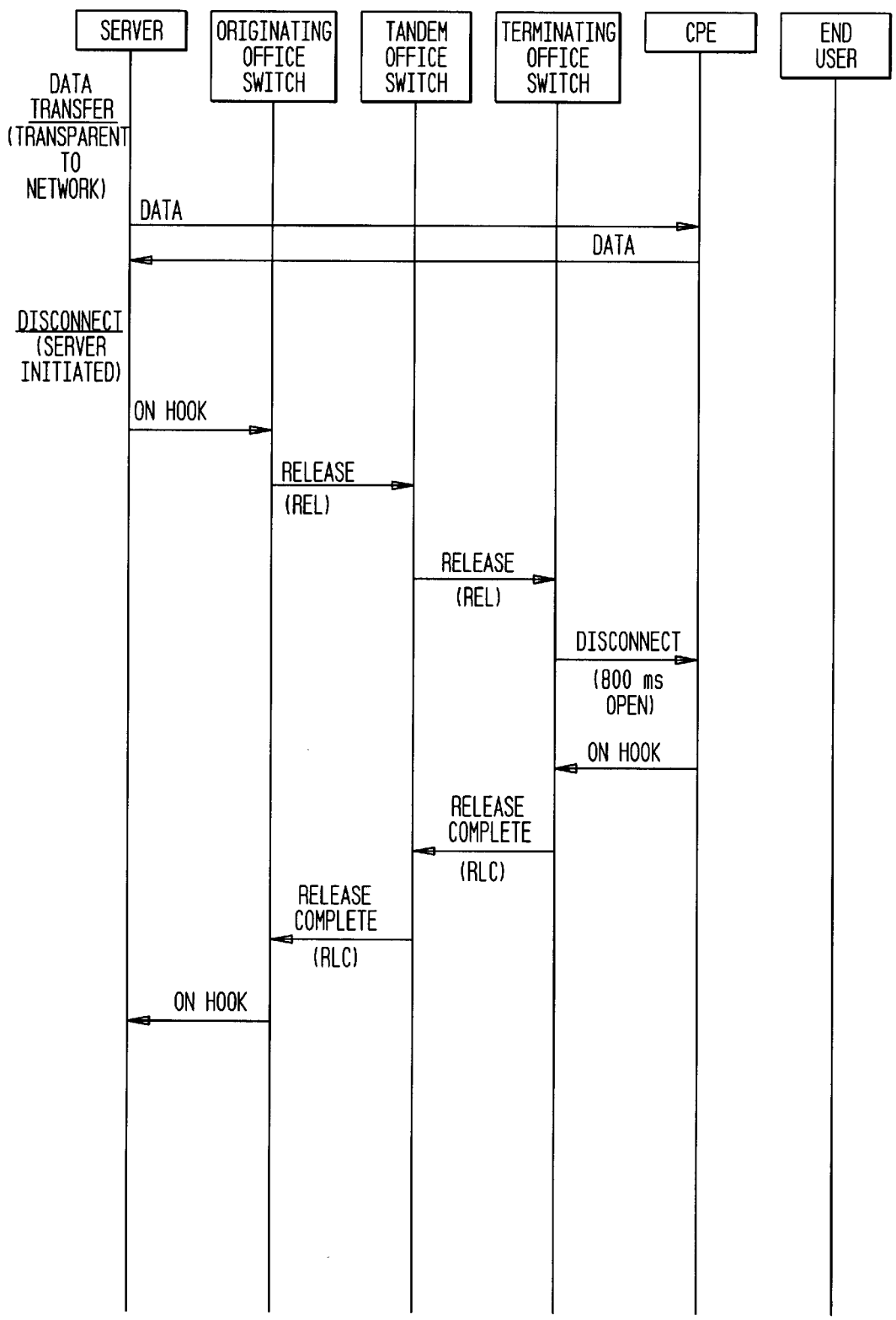

3.2.2 Intelligent Pathway Call Processing (Connect & Data Transfer)
3.2.2.1 End Users Line Not Busy (FIGS. 2 & 3)

With the E & M interoffice trunking implementation, if the line is not busy (traffic or maintenance), the application service provider is cut through to the end users line, and, if instructed, a specified Abbreviated Ring duration or Loop Current Feed Open is initiated by the terminating switch to assign a time slot in the Universal SLC equipment. The end users phone is not rung. A Wink (Connect) is sent from the switch to the application service provider to indicate that cut-through has occurred, the requested abbreviated ringing or open interval has been sent on the line, and the application service provider can apply the CPE Alert Tone. When alerted, the CPE will go off-hook, become active and transmit data. Only off-hook CPE data transmission interfaces are supported although on-hook data transmission is supported in the IEEE standards. After Wink (Connect), when any CPE goes off-hook, the switch signals off-hook to the application service provider indicating a successful CPE off-hook and to remove the alert tone. If the TIU, (Telemetry Interface Unit) of the CPE does not go off-hook to answer the call, the application service provider or switch will disconnect the call.

The Intelligent Pathway data transfer state is entered between the application service provider and the CPE. This data transfer state is completely transparent to the switch.

With the CCS7 implementation, a similar call flow applies. Upon receipt of the digits, the originating switch signals an Initial Address Message (IAM). The terminating switch connects to the available line and applies the required abbreviated ringing or loop open to the line. The terminating switch returns the Address Complete Message (ACM) to the originating switch. Upon receipt of the ACM message, the originating switch signals Wink (connect) to the application service provider. The application service provider then alerts the CPE. When the CPE goes off-hook, the terminating switch signals Answer Message (ANM) to the originating switch. The originating switch signals off-hook to the application service provider. Only off-hook CPE data transmission will be supported but over time it is anticipated that on-hook CPE data transmission will have to be supported.

At least two approaches can be used for alerting. The server can send a signal such as a 500 Hz tone to alert the CPE. Alternatively, the network can alert the CPE from any switch in the connection by sending a message such as a Bellcore TR-30 message, an FSK alerting data stream used in Caller Identification, and ADSI telephones to the CPE.

Figure 7:
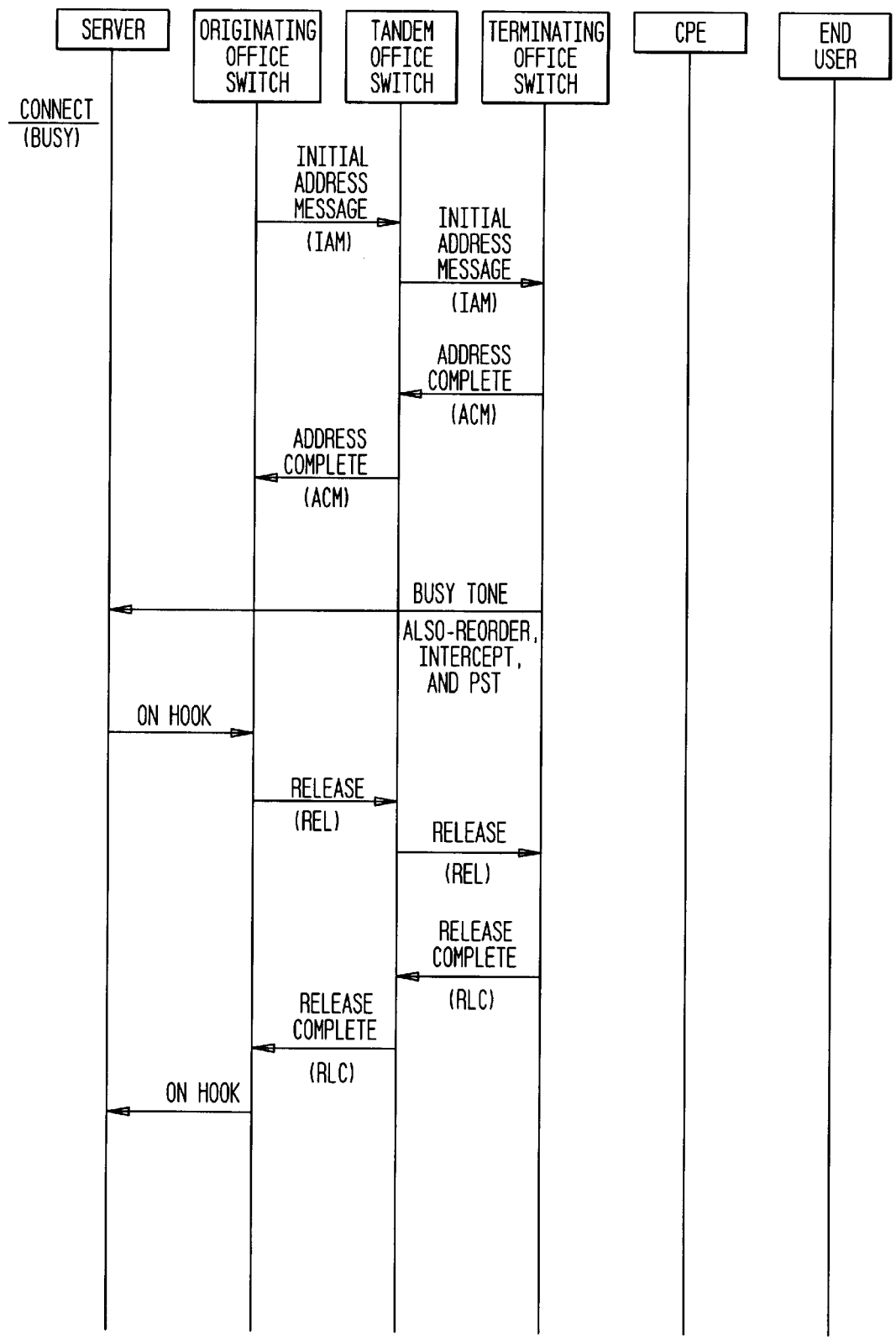
FIG. 7 illustrates the steps of responding to a busy terminal when originating an intelligent pathway trunk connection.

3.2.2.2 End Users Line Busy or Not Available (FIG. 7)

With the E & M interoffice trunking implementation, if the end users line is Busy (traffic, maintenance, Intelligent Pathway call) or Not Available, the Intelligent Pathway Trunk will signal a Busy, Intercept, Reorder Tone, or Permanent Signal Tone to the application service provider. The application service provider will, depending on the application requirements, bypass this Directory Number until a later time. In response to these switch signals, the service provider will signal on-hook to the switch.

With the CCS7 interoffice trunking capability, a similar call flow applies. Upon receipt of the digits, the originating switch signals an Initial Address Message (IAM). Address Complete (ACM) is returned to the originating switch. When the terminating switch determines the line is Busy, or Not Available, the terminating switch signals the application service provider with one of the previously defined inband tones. When Busy or another unavailable signal tone is received by the application service provider, the application service provider releases the call by signaling on-hook the to switch. The originating switch signals Release (REL) to the terminating switch. In response, the terminating switch signals Release Complete (RLC) to the originating switch.

3.2.3 Intelligent Pathway Trunk Disconnect

The CPE and application service provider should go on-hook and become inactive upon loss of carrier or signal level.

3.2.3.1 Disconnect Initiated by the Application Service Provider (FIG. 3)

With the analog or digital E & M trunking implementation, the application service provider initiates this disconnect by signaling on-hook to the switch. The switch takes down the call and transmits a Disconnect (Open) of approx 800 ms duration to the CPE as an indicator to go on-hook and become inactive. The switch signals on-hook to the application service provider at the beginning of the Disconnect signal.

With the CCS7 interswitch trunking capability, the originating switch sends a Release message (REL) to the terminating switch. The terminating switch transmits a Disconnect (Open) of approximately 800 ms to the CPE. The terminating switch returns a Release Complete message (RLC) to the originating switch. The originating switch signals on-hook to the application service provider.

Figure 4:
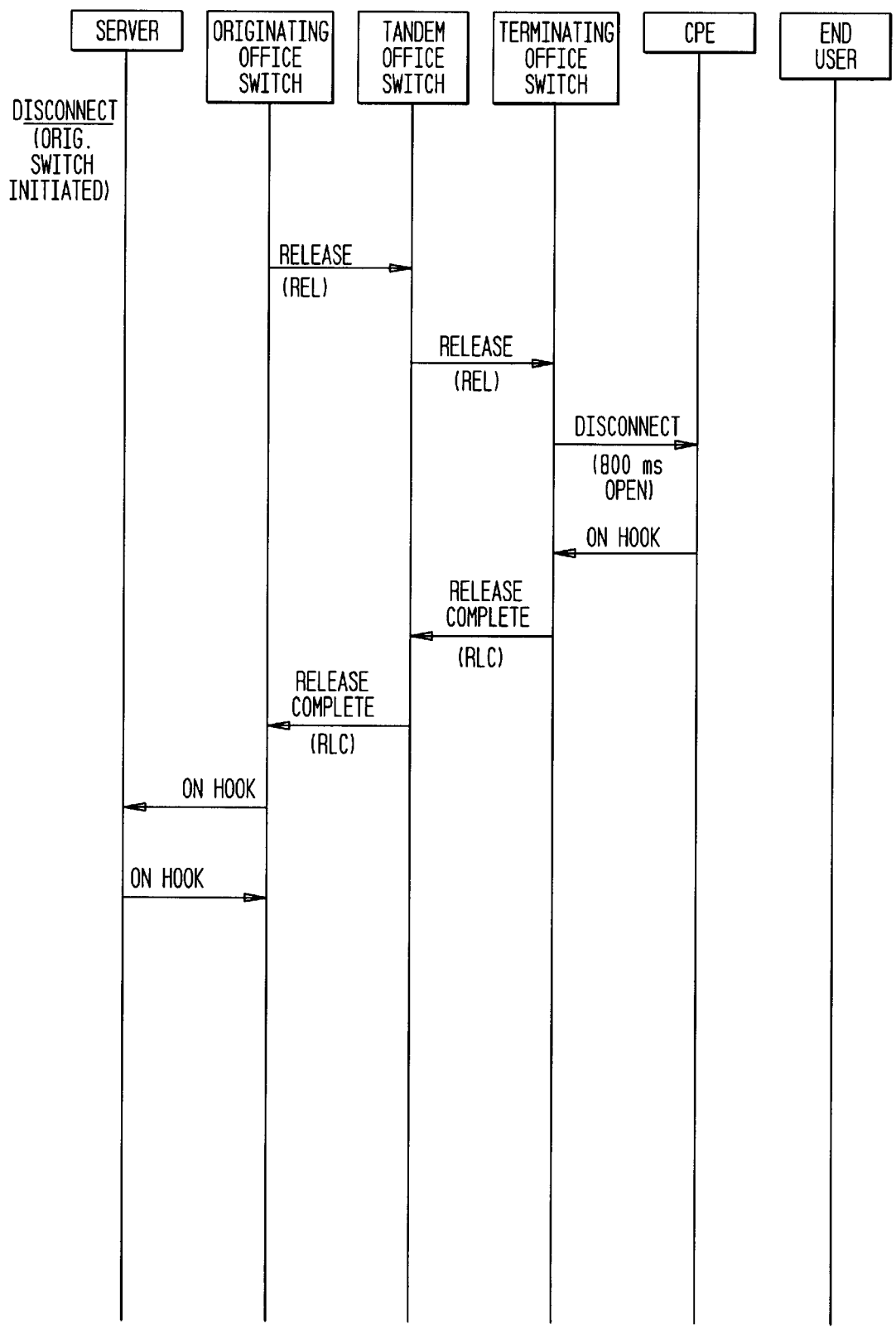
FIGS. 4 and 5 illustrate the steps of a disconnect initiated by the switch.
Figure 5:
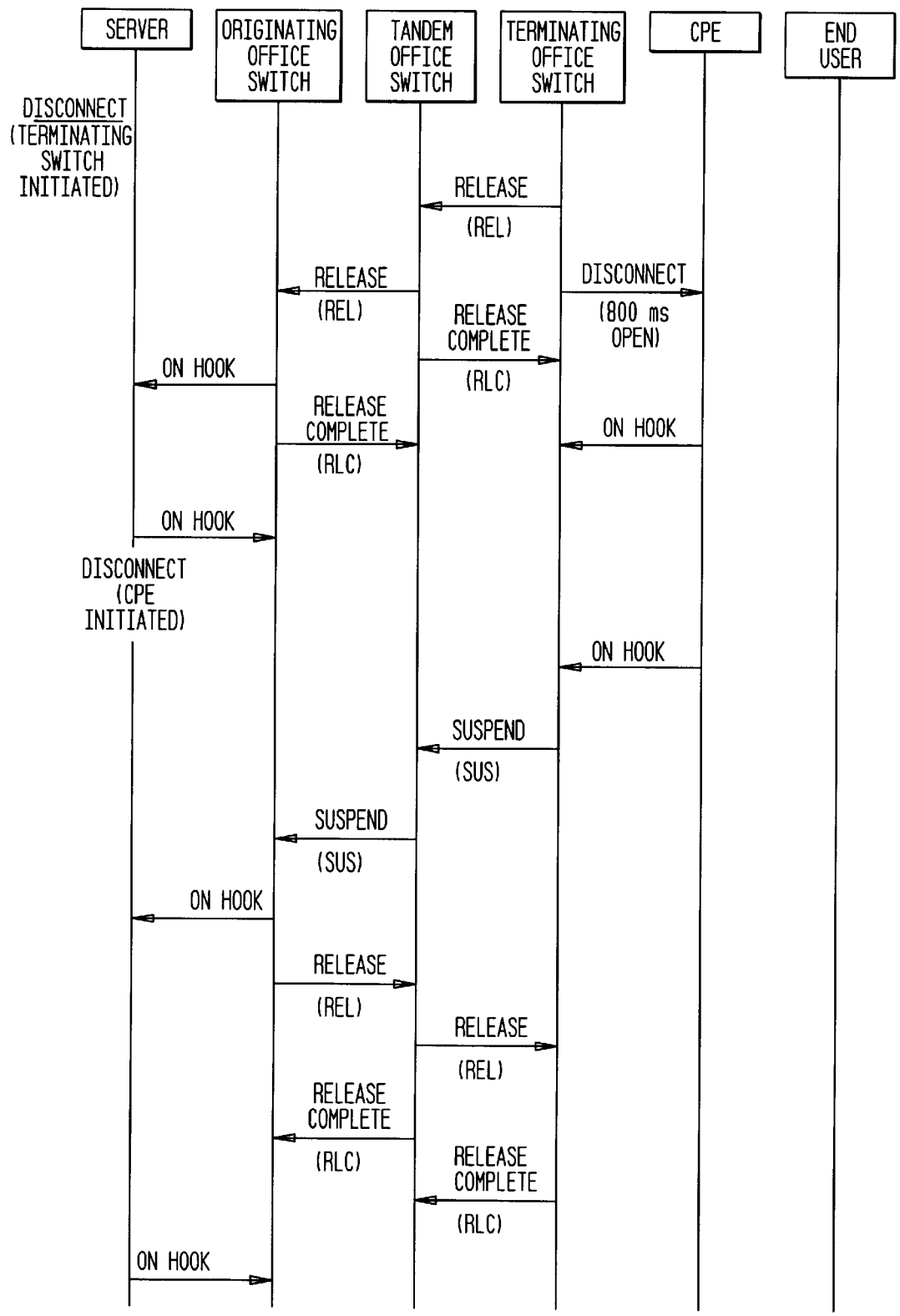

3.2.3.2 Disconnect Initiated by the Switch (FIGS. 4 & 5)

With the analog or digital E & M trunking implementation, the switch initiates this disconnect by taking down the call and transmitting a Disconnect (Open) of approx. 800 ms duration to the CPE as an indicator to go on-hook and become inactive. The switch signals on-hook to the application service provider at the beginning of the Disconnect signal. The application service provider responds with an on-hook signal to the switch.

3.2.3.3.1 Disconnect by the Originating Switch

With the CCS7 interswitch trunking capability, the originating switch sends a Release message (REL) to the terminating switch. The terminating switch signals a Disconnect (Open) on the line. The CPE signals On Hook. The terminating switch returns a Release Complete message (RLC) to the originating switch. The originating switch signals on-hook to the application service provider. The application service provider signals on hook to the originating switch.

3.2.3.2.2 Disconnect by tie Terminating Switch

With the CCS7 interswitch trunking capability, the terminating switch sends a Release message (REL) to the originating switch. The terminating switch signals a Disconnect (Open) on the line. The CPE signals On Hook. The originating switch returns a Release Complete message (RLC) to the originating switch. The originating switch signals on-hook to the application service provider. The application service provider signals on hook to the originating switch.

Figure 6:
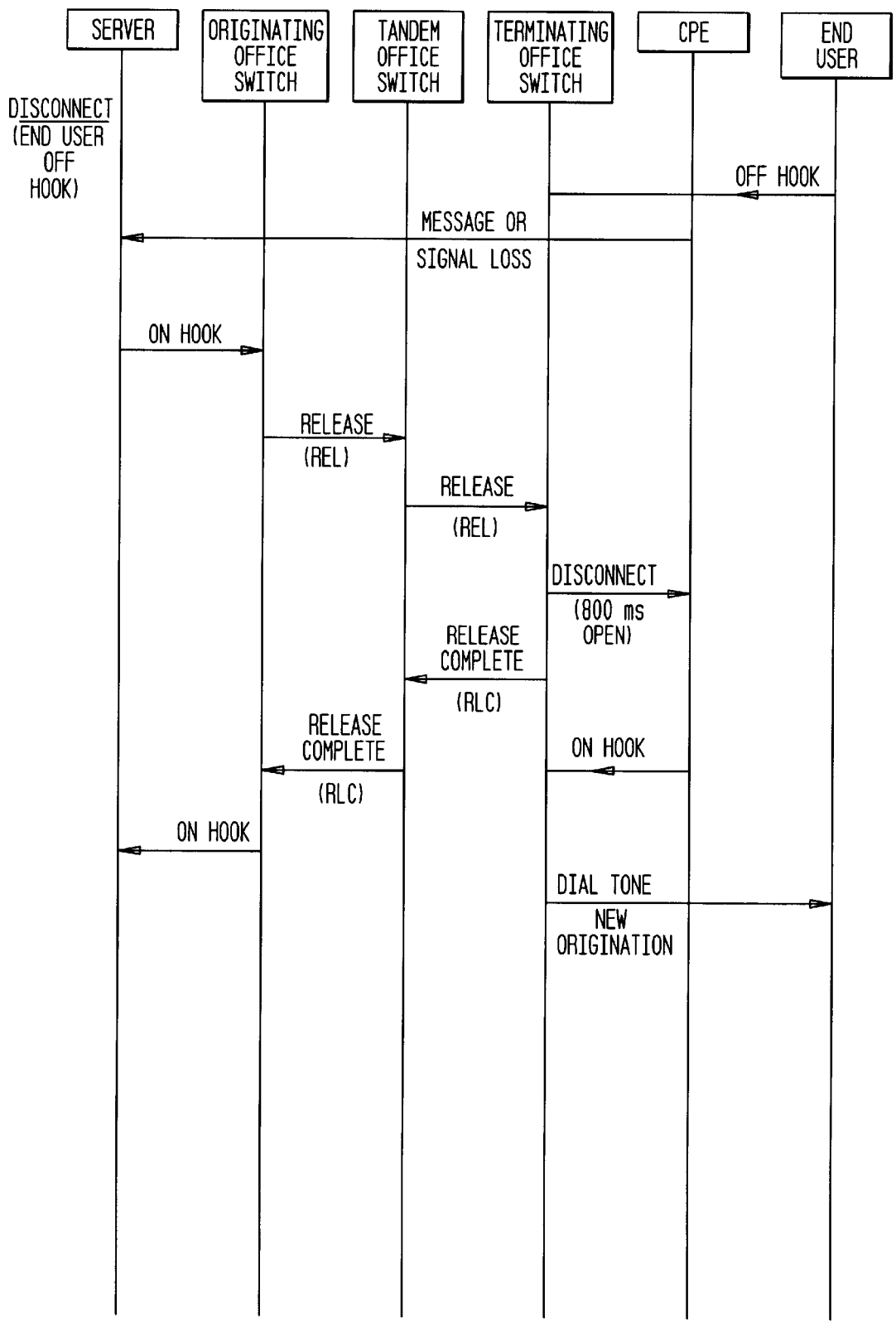
FIG. 6 illustrates the steps of a disconnect initiated by the end user going off-hook to make a separate call.

3.2.3.3 Disconnect Initiated by End User Going off-Hook (FIG. 6)

With tile analog or digital E & M interoffice trunking implementation, since the CPE is already off-hook, the switch can not detect the end user going off-hook. Therefore, the CPE must be responsible for detecting the end user off-hook signal, sending a disconnect (data message or signal loss) to the application service provider, going on-hook, and becoming inactive. The application service provider signals on-hook to the switch and disconnect occurs as described in the application service provider disconnect case. The switch, sensing an off-hook remaining on the line after the 800 ms Open, initiates a new origination and delivers Dial Tone to the end user in a possibly delayed interval.

With the CCS7 interswitch trunking capability, the CPE notifies the server if the end user goes off-hook, and the disconnect call flow is the same as a disconnect by the application service provider as described earlier. The terminating switch, sensing an off-hook remaining on the line after the Disconnect signal, initiates a new origination and delivers Dial Tone to the end user.

3.2.3.4 Disconnect Initiated by the CPE (FIG. 5)

With the analog or digital E & M interoffice trunking implementation, the CPE goes on-hook and becomes inactive. The switch senses an on-hook from the end users line. The switch signals on-hook to the application service provider and takes down the call. The application service provider returns on-hook to the switch.

With the CCS7 interswitch trunking capability, the terminating switch senses the CPE on-hook. The terminating switch sends a Suspend message (SUS) to the originating switch. The originating switch signals on-book to the application service provider and takes down the call. The originating switch signals a Release message (REL) to the terminating switch. In response, terminating switch signals Release Complete (RLC) to the originating switch.

The application service provider returns On-Hook to the originating switch.

Figure 8:
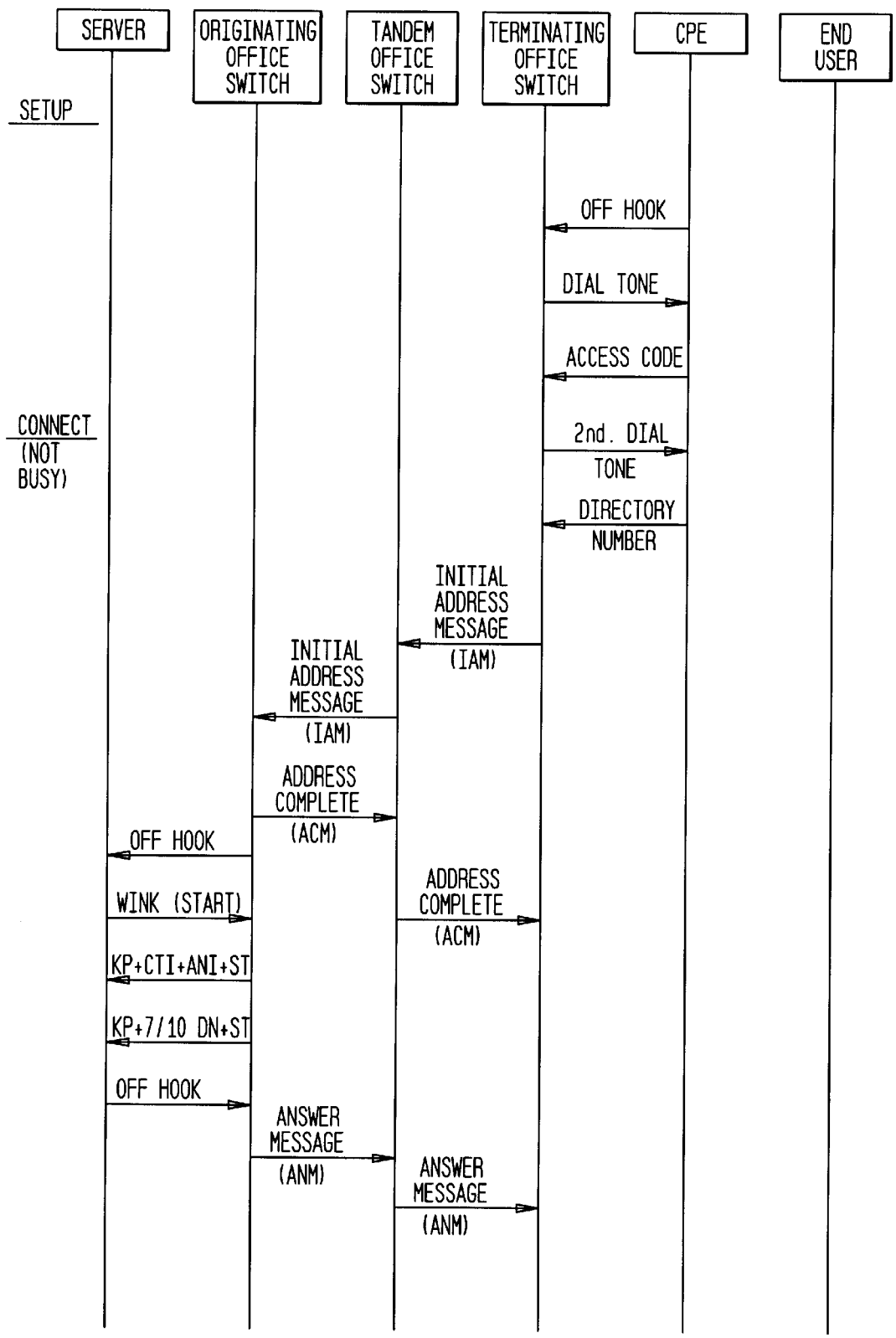
FIGS. 8–10 illustrate the steps of setting up an intelligent pathway originated by the end user.
Figure 9:
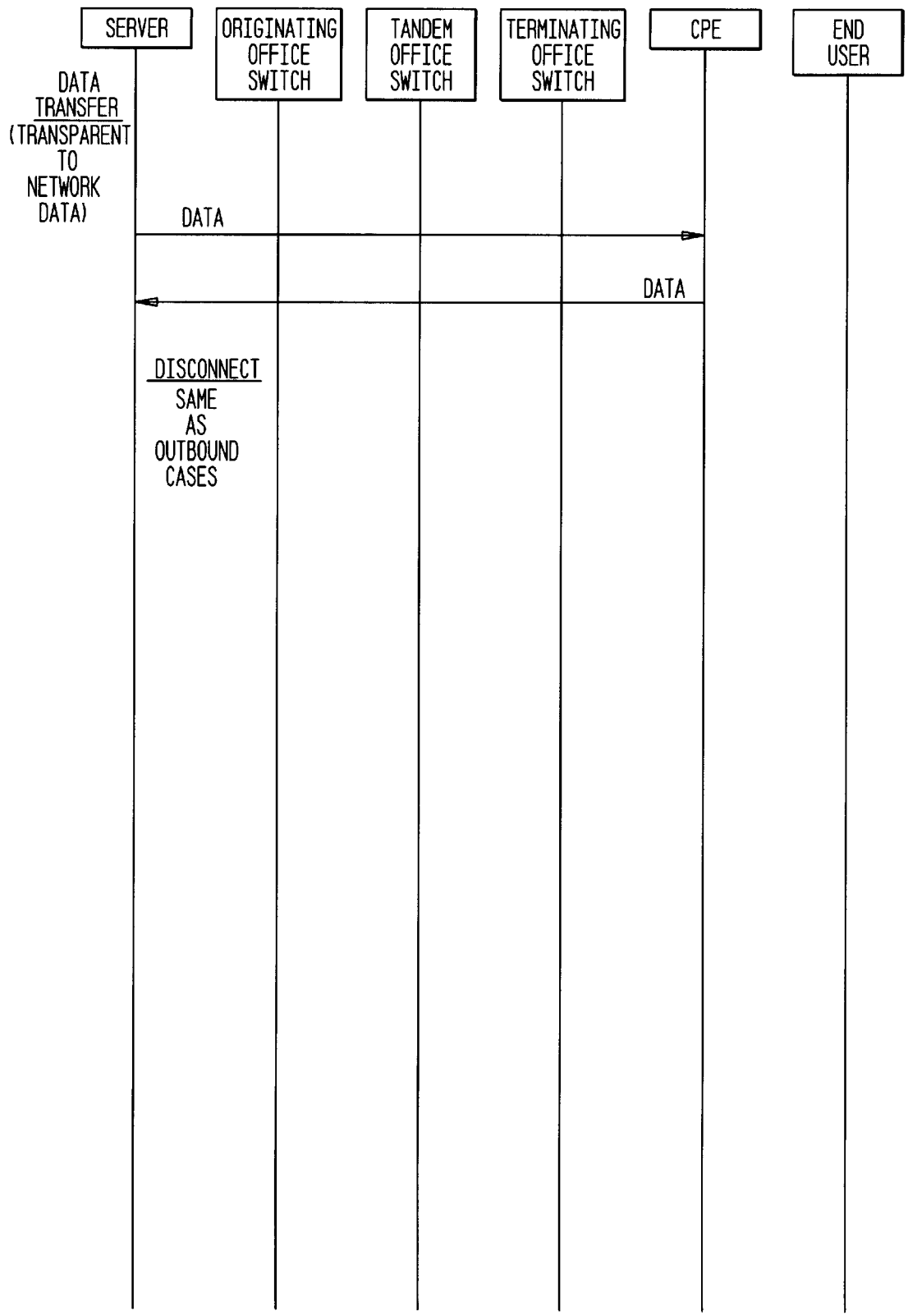
Figure 10:
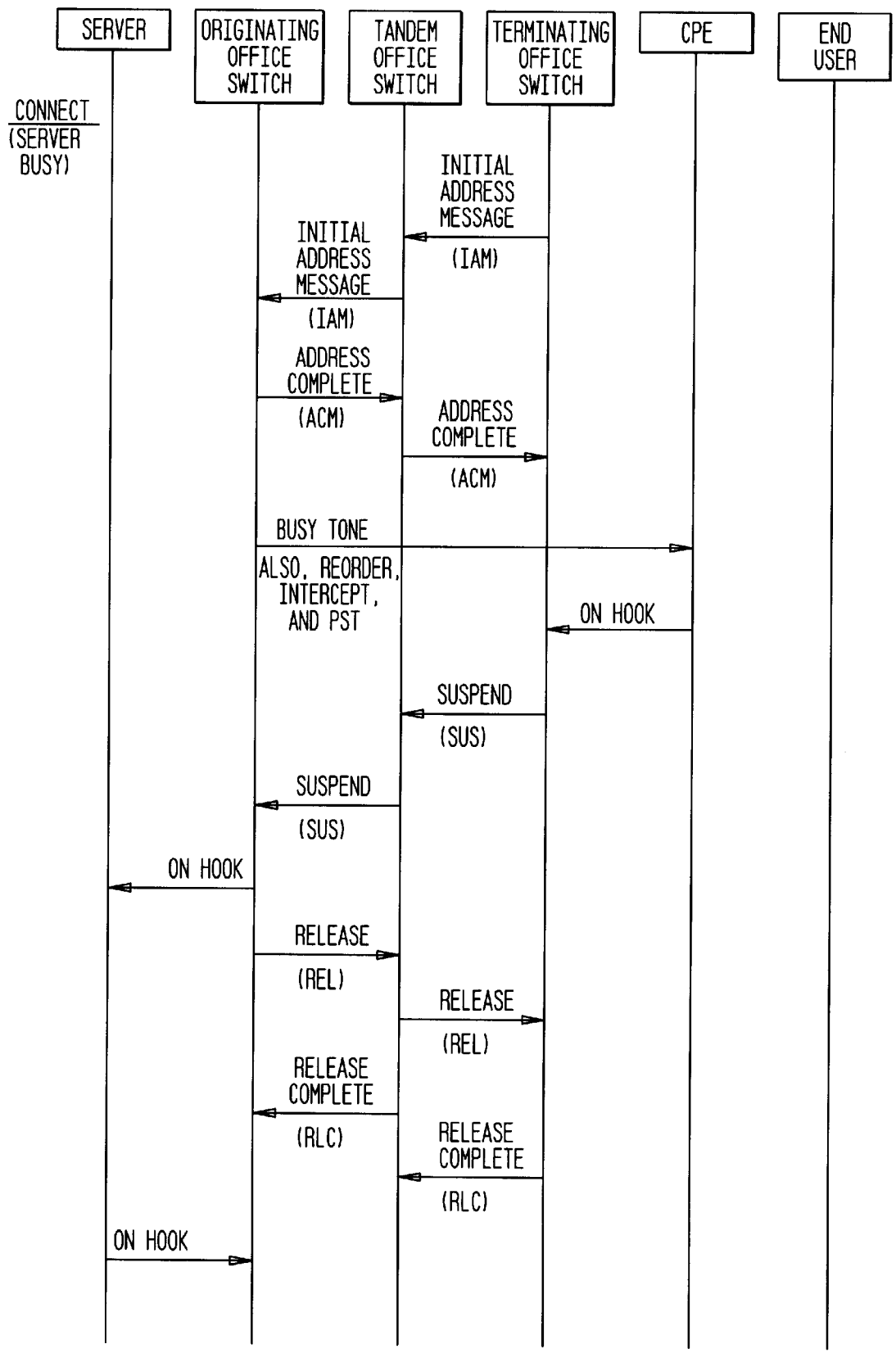

3.3 Intelligent Pathway Trunk Protocol—Inbound (FIGS. 8, 9, and 10)

Inbound Intelligent Pathway Service will route the call from the end user's line to the application service provider. The switch identifies the Intelligent Pathway call based on an access code. A second dial tone is presented for the destination Directory Number. The switch then ignores the end user's line features disruptive to Intelligent Pathway calls such as Call Waiting, Call Blocking, or Call Screening. The switch reactivates, (i.e., stops ignoring), the end user line features at the completion of the call. When the call is completed, an AMA record can be produced charging the application service provider for the call (reverse charging). Since these calls have reverse charging, inbound Intelligent Pathway calls can be allowed from lines that are unassigned for billing purposes(vacant houses etc.).

3.4 Utility Intelligent Pathway Trunk Protocol Expansion

An expanded Intelligent Pathway Trunk (UTT) Protocol is used for outbound or inbound calls. The protocol adds features such as Barge-In, a broadcast capability, and an end user subaddress capability (across the network). The TFIs described below command the switch to perform different functions. In these examples, a TFI value is assigned to a Barge-in Function, (YYY). When this valued is received by the switch, the switch connects this new telemetry call with the exiting end user conversation. Similarly, a broadcast command, (YYY) would take a current, or pre-defined message, and broadcast it to multiple end users. Again, a sub-address, (ZZZZ) is assigned, and is transmitted in addition to the FSK alert. Only the devices corresponding to the sub-address will respond.

---

KP + TFI + ANI + ST(ST', ST", ST''')
KP + DN/Directive + ST (ST', ST", ST''')
KP + NNNN + ST
where:
    ST in the first string defines the existing UTT protocol
    ST', ST", or ST''' in the first string represents the expanded protocol
    TFI = Intelligent Pathway Function Identification
        composed of XX YYY ZZZZ digits
            XX = 99 switch alert codes
            YYY = 999 function codes
            ZZZZ = Up to 9 digits, in the range of 0 to 7. Each digit
            represents the first 3 bits of a binary string. The 9 digits combine
            to form a binary string of 27 bits representing 33,554,432
            combinations to be used for device subaddressing. Each ST
            prime digit in the first protocol string would indicate tbe presence
            of the expanded protocol and would represent the presence of Z
            digits. For example, ST = basic Intelligent Pathway, ST three -continued Z digits present, ST" = six Z digits present, and ST'" = nine Z digits present. The variable amount of Z digits is to reduce the transmission time of the protocol string. In addition, Recent Change can be used to allow or not allow the presence or range of Z digits thereby making the protocol more efficient.

ANI is the Billing Directory Number of the service provider (no change from the basic Intelligent Pathway protocol)

7/10 DN is the connect to directory number (no change from the basic Intelligent Pathway protocol)

Directive=This parameter is used to identify a previously defined List identifier. For example, this parameter, in a broadcast capability, could identify the list of Directory Numbers to send the broadcast to. The parameter could also identify the list when the list is input to the switch.

NNNN=A variable length string of information, which can be a message to be sent to the CPE, a list of Directory Numbers to be used in a broadcast message, or a function to be performed.

The protocol is described in terms of MF digits. If the third protocol string contains other than digits 0–9 (ASCII or binary data), a data link (I/O channel) may be required to input the information. This protocol can also be converted to fields for incorporation in any other digital switch input technique such as a PRI link.

3.5 Suppressed Ringing Connection

The exemplary embodiment disclosed herein is for an off-hook-data-transmission suppressed ringing connection. For an on-hook-data-transmission connection, the TIU transmits on-hook, allowing the switch to recognize the end user off-hook signal to signify that the end user wishes to originate a call. This signal is then used by the terminating switch to cause the suppressed ringing connection to be disconnected, and to notify the server that the connection has been disrupted and should cause the server to disconnect. Billing for an off-hook-data-transmission suppressed ringing connection can be based on the off-hook signal, as in a normal call. Billing for an on-hook-data-transmission suppressed ringing call should start immediately after cut-through.

The principles of Applicants invention can also be applied to Integrated Services Digital Network (ISDN) lines. ISDN also provides end user features and ringing of end user lines. Suppressed ringing, when used in an ISDN context, is not affected by the features on the line and does not ring the line. Alerting is accomplished in-band by the ISDN equivalent of tones and FSK. Additionally, alerting is caused by the originator, (server) of the call, and not, necessarily, by the telephone network.

3.6 Dial-Up Link Between Application Controller (Server) and Local Serving Switch Another method of implementing the link between the Application Controller (Server) and the local serving switch, is to provide a predetermined "special" dial-in number that activates the suppressed ringing software on the serving switch to provide a suppressed ringing connection for the duration of the call(s). One or more suppressed ringing calls could be placed during one dial in session. An alternative would require the serving switch to terminate the original call at the special number, and hang up. The switch would place a call back to the Application Controller, thus providing for security while establishing a dedicated Suppressed Ringing call processing activation in the switch. If the security call back were not active, the switch would provide (suppressed ringing) security by looking at the Automatic Number Identification, (ANI) of the incoming call.

Security can be further enhanced by a dialog between the server and the switch.

This method of communicating with the switch over a server line eliminates the requirement that the links from the Controller to its local serving office be dedicated. Therefore, using this method of dialing a "special" number to activate the feature, permits the links to be dedicated for the duration of the call only.

Another advantage of this method of evoking the Suppressed Ringing feature may be seen if there are no CCS7 trunks to a far office. Using this method, a Controller may dial the "Special Suppressed Ringing" feature number on the far switch, and communicate directly to the far switch. The far switch is requested by virtue of receiving a call to the "Special Number", to provide the Suppressed Ringing call processing. Either security method could be implemented.

Alternatively, if CCS7 links are not available, the near switch may place a call to the far switch using the "Special Number" for Suppressed Ringing, and complete the call without the Controller knowing that the call has been routed in this manner. To accomplish this, the near switch would do a database look-up once it determines that CCS7 trunks are not available. A call is placed to the far end "Special Number" and bridged with the original telemetry call.

4.0 Conclusion

The above description is of one preferred embodiment of Applicants' invention. Many other embodiments will be apparent to those of ordinary skill in the art without departing from the scope of the invention. The invention is only limited by the attached Claims.

What is claimed is:

1. A method of establishing a suppressed ringing connection between a server and customer premises equipment (CPE), comprising the steps of:

connecting said server to a first switch of a Public Switched Telephone Network, (PSTN) by a server trunk;

initializing said first switch with class information for identifying a class of service of said server trunk;

connecting said CPE over a line to a second switch of said PSTN;

responsive to receipt of a suppressed ringing set-up request to said CPE from said server, received in said first switch over said server trunk, establishing a connection over said PSTN between said first switch and said second switch;

signaling information about said call over a common channel signaling network from said first switch to said second switch; and responsive to receipt of said information in said second switch from said signaling network, establishing a suppressed ringing connection over said connection from said first switch and said CPE;

wherein the step of signaling information about said call over said common channel signaling network comprises the step of providing information in a separate field of a common channel signaling message, to request a suppressed ringing connection and to provide information about the character of said suppressed ringing connection.

2. The method of claim 1, wherein the step of signaling information about said call comprises the step of converting call set-up analog signals received from said server to common channel signaling messages for conveying information received from said server in said first switch.

3. The method of claim 1, wherein the step of signaling information about said call comprises the step of converting call set-up digital carrier analog emulation signals received from said server to common channel signaling messages for conveying information received from said server in said first switch.

4. The method of claim 1, further comprising the step of following establishment of said suppressed ringing connection from said server to said CPE, alerting said CPE from said server.

5. The method of claim 1, further comprising the steps of:
detecting an end user origination of the end user of said CPE;
responsive to said detection, notifying said server;
disconnecting said server to said CPE suppressing ringing connection; and
providing dial tone to said end user to allow said end user to originate a call.

6. The method of claim 5, wherein said suppressed ringing connection uses on-hook-data-transmission, wherein the step of detecting comprises the step of:
detecting said end user originating call in said second switch by detecting an off-hook signal from said CPE.

7. The method of claim 5, wherein said suppressed ringing connection uses off-hook transmission, wherein the steps of detecting and notifying comprise the steps of:
detecting said origination in a telemetry interface unit, (TIU) of said CPE; and
said TIU notifying said server to disconnect said call.

8. The method of claim 1, wherein the connection between the server and the end user is unaffected by call features provided to said end user.

9. The method of claim 1, wherein said connection over said PSTN between said first switch and said second switch comprises a connection to a third switch, and wherein some signaling information about said call is transmitted over said common channel signaling network to said third switch.

10. Apparatus for establishing a suppressed ringing connection between a server and customer premises equipment (CPE), comprising:
a first switch connectable to a server by a server trunk;
a second switch, different from said first switch, connectable by a line to said CPE;
said first switch connectable by a Public Switched Telephone Network, (PSTN) to said second switch serving said CPE;
said PSTN comprising a Common Channel Signaling Network, for transmitting messages between said first and second switches, to request a suppressed ringing connection and to provide information about the character of said suppressed ringing connection in a separate field of a common channel signaling message, for establishing a connection between said first switch and said CPE via said second switch, and for transmitting signaling messages to control establishment and disconnection of a suppressed ringing connection between said server and said CPE.

11. The apparatus of claim 10, wherein said first switch stores class information for identifying a class of service said server trunk.

12. The apparatus of claim 10, wherein said first switch further comprises means for converting call set-up signals received over said server trunk into Common Channel Signaling signals for transmission toward said second switch.

13. The apparatus of claim 10, further comprising means for alerting said CPE from said server.

14. The apparatus of claim 10, wherein said suppressed ringing connection uses on-hook-data-transmission further comprising:
means for detecting an origination by said end user of said CPE by detecting an off-hook signal from said CPE.

15. The apparatus of claim 10, wherein said suppressed ringing connection uses off-hook transmission further comprising:
means for detecting an origination by an end user of said CPE in a telemetry interface unit of said CPE; and
means for notifying said server from said TIU to disconnect said call.

16. A method of establishing a suppressed ringing connection between a server and customer premises equipment (CPE), comprising the steps of:
connecting said server to a first switch of a Public Switched Telephone Network, (PSTN) by a server line;
initializing said first switch with class information for identifying a class of service of said server line;
connecting said CPE over a line to a second switch of said PSTN;
responsive to receipt of a suppressed ringing set-up request to said CPE from said server, received in said first switch over said server line, establishing a connection over said PSTN between said first switch and said second switch;
signaling information about said call over a common channel signaling network from said first switch to said second switch; and
responsive to receipt of said information in said second switch from said signaling network, establishing a suppressed ringing connection over said connection from said first switch and said CPE;
wherein the step of signaling information about said call over said common channel signaling network comprises the step of providing information in a separate field of a common channel signaling message, to request a suppressed ringing connection and to provide information about the character of said suppressed ringing connection.

17. The method of claim 16, wherein the step of signaling information about said call comprises the step of converting call set-up analog signals received from said server to common channel signaling messages for conveying information received from said server in said first switch.

18. The method of claim 16, further comprising the step of following establishment of said suppressed ringing connection from said server to said CPE, alerting said CPE from said server.

19. The method of claim 16, further comprising the steps of:
  detecting an end user origination of the end user of said CPE;
  responsive to said detection, notifying said server;
  disconnecting said server to said CPE suppressing ringing connection; and
  providing dial tone to said end user to allow said end user to originate a call.

20. The method of claim 19, wherein said suppressed ringing connection uses on-hook-data-transmission, wherein the step of detecting comprises the step of:
  detecting said end user originating call in said second switch by detecting an off-hook signal from said CPE.

21. The method of claim 19, wherein said suppressed ringing connection uses off-hook transmission, wherein the steps of detecting and notifying comprise the steps of:
  detecting said origination in a telemetry interface unit, (TIU) of said CPE; and
  said TIU notifying said server to disconnect said call.

22. The method of claim 16 wherein the connection between the server and the end user is unaffected by call features provided to said end user.

23. The method of claim 16, wherein said connection over said PSTN between said first switch and said second switch comprises a connection to a third switch, and wherein some signaling information about said call is transmitted over said common channel signaling network to said third switch.

24. The method of claim 16, wherein the step of connecting said server to said first switch comprises the steps of:
  receiving an incoming call from said server; and
  calling said server back from said first switch.

25. The method of claim 24, wherein the step of calling said server back from said first switch includes the step of performing security verification.

26. The method of claim 24, wherein the step of connecting said server to said first switch comprises the step of one connecting said server to said first switch via an intermediate switch.

27. Apparatus for establishing a suppressed ringing connection between a server and customer premises equipment (CPE), comprising:
  a first switch connectable to a server by a server line;
  a second switch, different from said first switch, connectable by a line to said CPE;
  said first switch connectable by a Public Switched Telephone Network, (PSTN) to said second switch serving said CPE;
  said PSTN comprising a Common Channel Signaling Network, for transmitting messages between said first and second switches, to request a suppressed ringing connection and to provide information about the character of said suppressed ringing connection in a separate field of a common channel signaling message, for establishing a connection between said first switch and said CPE via said second switch, and for transmitting signaling messages to control establishment and disconnection of a suppressed ringing connection between said server and said CPE.

28. The apparatus of claim 27, wherein said first switch stores class information for identifying a class of service of said server line.

29. The apparatus of claim 27, wherein said first switch further comprises means for converting call set-up signals received over said server line into Common Channel Signaling signals for transmission toward said second switch.

30. The apparatus of claim 27, further comprising means for alerting said CPE from said server.

31. The apparatus of claim 27, wherein said suppressed ringing connection uses on-hook-data-transmission further comprising:
  means for detecting an origination by said end user of said CPE by detecting an off-hook signal from said CPE.

32. The apparatus of claim 27, wherein said suppressed ringing connection uses off-hook transmission further comprising:
  means for detecting an origination by an end user of said CPE in a telemetry interface unit, (TIU) of said CPE; and
  means for notifying said server from said TIU to disconnect said call.

33. The apparatus of claim 27, wherein said first switch further comprises:
  means for receiving an incoming call from said server; and
  means for calling said server back from said first switch.

34. The apparatus of claim 33, wherein said first switch further comprises means for performing security verification.

35. The apparatus of claim 33, wherein said first switch further comprises means for receiving a call from said via an intermediate switch.

* * * * *